United States Patent
Lippert et al.

(10) Patent No.: US 11,537,442 B2
(45) Date of Patent: Dec. 27, 2022

(54) APPLICATION RUNTIME DETERMINED DYNAMICAL ALLOCATION OF HETEROGENEOUS COMPUTE RESOURCES

(71) Applicant: ParTec Cluster Competence Center GmbH, Munich (DE)

(72) Inventors: Thomas Lippert, Aschaffenburg (DE); Bernhard Frohwitter, Munich (DE)

(73) Assignee: ParTec Cluster Competence Center GmbH, Munich (DE)

( * ) Notice: Subject to any disclaimer, the term of this patent is extended or adjusted under 35 U.S.C. 154(b) by 35 days.

(21) Appl. No.: 16/963,749

(22) PCT Filed: Jan. 23, 2019

(86) PCT No.: PCT/EP2019/051615
§ 371 (c)(1),
(2) Date: Jul. 21, 2020

(87) PCT Pub. No.: WO2019/145354
PCT Pub. Date: Aug. 1, 2019

(65) Prior Publication Data
US 2021/0096923 A1 Apr. 1, 2021

(30) Foreign Application Priority Data
Jan. 23, 2018 (EP) .................................. 18152903

(51) Int. Cl.
*G06F 9/50* (2006.01)
(52) U.S. Cl.
CPC ...... *G06F 9/5061* (2013.01); *G06F 2209/509* (2013.01)
(58) Field of Classification Search
CPC .......................... G06F 9/5061; G06F 2209/509
See application file for complete search history.

(56) References Cited

U.S. PATENT DOCUMENTS

2012/0317168 A1* 12/2012 Driesen .................. G06Q 30/06
709/202
2013/0282787 A1* 10/2013 Lippert ............. H04L 29/08081
709/201

FOREIGN PATENT DOCUMENTS

| EP | 2442228 A1 | 4/2012 |
| WO | WO-2018065530 A1 | 4/2018 |

OTHER PUBLICATIONS

International Search Report for International Application No. PCT/EP2019/0518615, dated Apr. 29, 2019.
(Continued)

*Primary Examiner* — Sisley N Kim
(74) *Attorney, Agent, or Firm* — Marshall, Gerstein & Borun LLP

(57) ABSTRACT

The present invention provides a method of operating a heterogeneous computing system comprising a plurality of computation nodes and a plurality of booster nodes, at least one of the plurality of computation nodes and plurality of booster nodes being arranged to compute a computation task, the computation task comprising a plurality of sub-tasks, wherein in a first computing iteration, the plurality of sub-tasks are assigned to and processed by ones of the plurality of computation nodes and booster nodes in a first distribution; and information relating to the processing of the plurality of sub-tasks by the plurality of computation nodes and booster nodes is used to generate a further distribution of the sub-tasks between the computation nodes and booster node for processing thereby in a further computing iteration.

10 Claims, 1 Drawing Sheet

(56) References Cited

OTHER PUBLICATIONS

Written Opinion for International Application No. PCT/EP2019/0518615, dated Apr. 29, 2019.
"Dynamic Process Management With Allocation—Internal CO—Scheduling Towards Interactive Supercomputing," Clauss, et al., Conference Paper, DOI: 10.14459/2016md1288835, Jan. 19, 2016.
"The Deep Project an Alternative Approach to Heterogeneous Cluster-Computing in the Many-Core Era," Eicker, et al., Concurrency and Computation: Practice and Experience, Pract. Exper. 2016; 28; 2394-2411, Wiley Online Library (wileyonlinelibrary.com), Published online Jul. 27, 2015.

\* cited by examiner

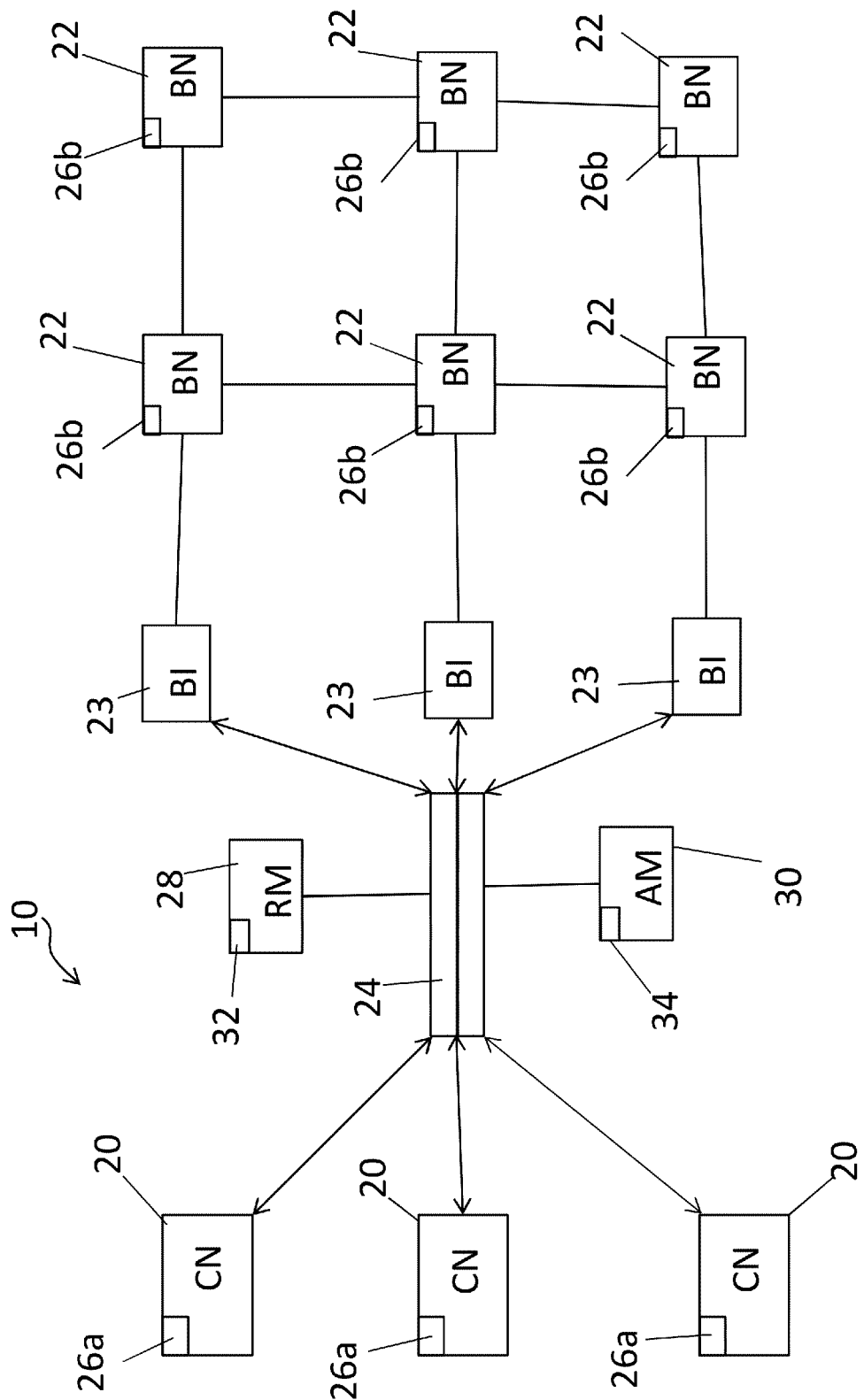

APPLICATION RUNTIME DETERMINED DYNAMICAL ALLOCATION OF HETEROGENEOUS COMPUTE RESOURCES

CROSS-REFERENCE TO RELATED APPLICATIONS

This is the United States national phase of International Patent Application No. PCT/EP2019/051615, filed Jan. 23, 2019, which claims priority to EP 18152903.3 filed Jan. 23, 2018, the entire contents of each of which are hereby incorporated by reference herein.

FIELD OF THE DISCLOSURE

The present invention relates to a mechanism for executing computation tasks within a computation environment, in particular a heterogeneous computation environment adapted for parallel processing of a computation task.

BACKGROUND

The present invention is a development of the system described in earlier application WO 2012/049247 A1, WO '247, which describes a cluster computer architecture comprising a plurality of computation nodes and a plurality of boosters connected together via a communication interface. A resource manager is responsible for assigning one or more of the boosters and the computation nodes to each other in a dynamic manner during runtime. An example for such dynamic process management is described in Clauss et al. "Dynamic Process Management with Allocation-internal Co-Scheduling towards Interactive Supercomputing", COSH 2016 Jan. 19, Prague, CZ, incorporated herein by reference for all purposes. While the arrangement of WO '247 provides a flexible arrangement for assigning boosters to computation nodes, it does not address how to distribute tasks between computation nodes and boosters.

The arrangement of WO '247 is further described by Eicker et al. in "The DEEP Project An alternative approach to heterogeneous cluster-computing in the many core era", Concurrency Computat.: Pract. Exper. 2016; 28:2394-2411. The heterogeneous system which is described comprises a plurality of computation nodes and a plurality of booster nodes connected by a switchable network. In order to process an application, the application is "taskified" in order to provide an indication which tasks may be off-loaded from a computation node to a booster. This taskifying is achieved by the application developer annotating the code with pragmas indicating dependencies between different tasks and in addition labels indicating the highly scalable code parts which are to be processed by a booster. Scalability in this context means when the load offered to the service increases, an incremental and linear increase in hardware can maintain the same per-user level of service.

US 2017/0262319 A1 describes in one aspect runtime processes that can fully or partially automate the distribution of data and mapping of tasks to computing resources. A so-called tuning expert, i.e. a human operator, may still be required for mapping actions to available resources. In essence it is described how a given application to be computed can be mapped on a given computing hierarchy.

GENERAL DESCRIPTION

The present invention provides a method of operating a heterogeneous computing system comprising a plurality of computation nodes and a plurality of booster nodes, at least one of the plurality of computation nodes and plurality of booster nodes being arranged to compute a computation task, the computation task comprising a plurality of sub-tasks, wherein in a first computing iteration, the plurality of sub-tasks are assigned to and processed by ones of the plurality of computation nodes and booster nodes in a first distribution; using information relating to the processing of the plurality of sub-tasks by the plurality of computation nodes and booster nodes to generate a further distribution of the sub-tasks between the computation nodes and booster nodes for processing thereby in a further computing iteration.

Preferably, the information is provided by respective daemons operating in each of the computation and booster nodes. The information provided allows an application manager to determine if the distribution of sub-tasks between computation nodes and booster nodes can be adapted or improved upon for a further computing iteration.

A resource manager may determine the assignment of tasks and sub-tasks to the computation nodes and booster nodes for the first iteration as a function of the computation task and further parameters. The application manager processes the information as input to the resource manager such that the resource manager dynamically alters further distributions during the computing of the computation task.

In a further aspect of the invention, the resource manager, based on the information dynamically alters assignment of the computation nodes and booster nodes to each other during the computation of the computation task.

The initial distribution may also be determined by the application manager using information provided by a user of the system in programming code compiled for execution by the system. Alternatively, the application manager may be so arranged to generate such a distribution based on an analysis of the sub-task coding.

In a further aspect, the invention provides a heterogeneous computing system comprising a plurality of computation nodes and a plurality of booster nodes for computing one or more tasks comprising multiple sub-tasks, a communication interface connecting the computation nodes with each other and the booster nodes, wherein the system comprises a resource manager for assigning booster nodes and computation nodes to each other for the computing of the tasks and wherein the system further comprises an application manager, the application manager being arranged to receive information from daemons operating in the computation nodes and booster nodes to update a distribution of the sub-tasks between the computation nodes and the booster nodes between a first computing iteration and a further computing iteration.

In still a further aspect of the invention, the resource manager receives the information such that the resource manager dynamically alters assignment of the computation nodes and booster nodes to each other during the computation of the computation task. Preferred embodiments of the invention will now be described, by way of example only, with reference to the accompanying drawings in which:

BRIEF DESCRIPTION OF THE DRAWINGS

FIG. 1 shows a schematic diagram of a cluster computer system incorporating the invention.

DETAILED DESCRIPTION OF THE DRAWINGS

Referring to FIG. 1, there is shown a schematic representation of a cluster computer system 10 incorporating the invention. The system 10 comprises a number of computation nodes 20 and a number of booster nodes 22. The computation nodes 20 and the booster nodes are connected via a communication infrastructure 24, with the booster nodes being connected to the communication interface via a booster interface 23. Each of the computation nodes 20 and the booster nodes 22 is represented schematically by a rectangle and each of these nodes in operation incorporates at least one of a respective daemon 26*a* and 26*b*, schematically illustrated by a square within the rectangle of the respective node. A daemon of the present invention is an application which runs as a background process and is capable of providing the information as used herein. Clauss et al. "Dynamic Process Management with Allocation-internal Co-Scheduling towards Interactive Supercomputing", COSH 2016 Jan. 19, Prague, CZ, disclose daemons as addressed herein, and the contents of this paper are incorporated herein by reference for all purposes.

The system 10 also includes a resource manager 28 shown connected to the communication infrastructure 24 and an application manager 30. Each of the resource manager 28 and the application manager 30 includes a respective daemon 32 and 34.

The computation nodes 20 may be identical to one another or may have differing characteristics. Each computation node incorporates one or more multi-core processors such as the Intel XeonE5-2680 processor. The nodes are connected together by means of a communication interface which may be based on a Mellanox InfiniBand ConnectX fabric capable of transferring data at a rate of many Gbit/s. The computation nodes interface via the communication interface to the plurality of booster nodes, ideally through a series of booster interfaces 40. As shown, the booster nodes host at least one accelerator-type processor, for example an Intel Xeon Phi many core processor, capable of autonomously booting and running its own operating system. Such technology is described in Concurrency Computat.: Pract. Exper. 2016; 28:2394-2411 referred to above.

Further, the system 10 may include a modular computing abstraction layer as described in unpublished application PCT/EP2017/075375, incorporated herein by reference for all purposes, for enabling communication between the daemons and the application manager.

A job to be computed by the system may comprise a number of tasks some of which or all may be repeated a number of times during the execution of the job. For example the job may be a "Monte-Carlo" based simulation where an effect is modelled using a random number, the calculations being repeated many times in succession.

The tasks may comprise a number of sub-tasks or kernels. Each of these sub-tasks may be more or less suitable for processing by one or more of the computation nodes or one or more of the boosters. In particular, the scalability of the sub-task may indicate whether it is more appropriate for the sub-task to be processed by a computation node or a booster. The system is flexible in all directions, also permitting joint processing of sub-tasks by all nodes addressed herein, as well as reshuffling of processing between the nodes.

If a task is computed with a first division of sub-tasks between a computation node and a booster, it is possible that such a division is not an optimal division for the computation of the task. Certain sub-tasks which were assigned to a booster on the first iteration might in fact not be suitable for processing by the booster such that a processing of the sub-tasks by a computation node rather than a booster might optimize the computation of the task as a whole. Accordingly, for a second and possible further iterations, if needed, of the task with an altered second and/or further sub-task distribution might improve the efficiency of the computation of the task.

Accordingly, the system 10 includes a mechanism whereby each of the computation nodes and the cluster nodes are arranged such that daemons 26*a*, 26*b* and 32 feed back information to the daemon 34 relating to the processing of sub-tasks and a current state of the respective processing entity. The daemon 34 uses the information provided by the daemons 26*a*, 26*b* and 32 to determine whether the distribution of sub-tasks to computation nodes and boosters could be adjusted to optimize or adapt the computation of the task for a subsequent iteration. The resource manager can also reassign computation nodes and boosters to each other, in addition to the adjusted distribution of tasks.

A job including a task in which an operator has estimated a scalability factor for each sub-task is input into the system. This task is compiled and the compiled code is executed. In the execution, a task is analyzed by the application manager and sub-tasks of the task are divided into computation node suitable sub-tasks and booster suitable sub-tasks and this information is passed to the resource manager for assignment of boosters to computation nodes. During a first iteration of the task, the results of the execution of the sub-tasks are collected together with the information from the daemons concerning the processing of the sub-tasks and the status of the nodes. The application manager then performs a reassignment of the sub-tasks for a subsequent iteration of the task and passes this updated assignment information to the resource manager which may also adjust the assignment of boosters to nodes accordingly.

For each iteration, the daemons operating in the computation nodes and the boosters report status information to the application manager and the resource manager enabling the calculation of subsequent iterations to be optimized by a further adjustments to the allocation of sub-tasks to computation nodes and boosters.

While the above procedure has been described incorporating a taskifying step in which an initial scalability factor may be inputted by the program coder, it is also possible for the application manager to automatically set an initial scalability factor for the sub-tasks, with subsequent iterations improving on this initial setting. Such an arrangement has the benefit that coding of the tasks is made more straightforward, thereby enabling an improved usability of the system to program coders unfamiliar with cluster computing applications.

As well as adjusting the distribution of sub-tasks between computation nodes and boosters based on a scalability of the sub-task, the distribution may also be influenced by information learned about the processing of the sub-task and any need to call further sub-tasks during the processing. If a first sub-task being handled by a booster requires input from a second sub-task not being handled by the booster, this may lead to an interruption in the processing of the first sub-task. Accordingly, the daemon at the booster handling the first sub-task can report this situation to the application manager such that in a further iteration both the first and second sub-tasks are handled by the booster. Accordingly, the application manager is arranged using the information provided by the daemons operating in the computation nodes and the boosters to adjust groupings of sub-tasks for assignment to the computation nodes and boosters.

While the computation nodes in FIG. 1 have been given the same reference numeral, as have the booster nodes, this does not imply that all the computation nodes are identical to each other and all the booster nodes are also identical to each other. The system 10 may have computation nodes and/or booster nodes added to the system which differ in characteristics from the other computation/booster nodes. Accordingly, particular ones of the computation nodes and/or booster nodes may be particularly suited to processing particular sub-tasks. The application manager takes this structural information into account and passes such assignment information to the resource manager to ensure that the sub-tasks are distributed in an optimum manner.

An important aspect of the invention comes with the recognition that a mapping, tailoring of computation tasks, and sub-tasks onto a computer hierarchy may not provide sufficient use of the inherent flexibility and adaptability of the computer architecture, as shown as an example according to WO 2012/049247 A1. Therefore, the present invention integrates tailoring the application task most sufficiently, as an example according to WO 2017/0262319 A1, as well as configuring dynamically the computation nodes and booster nodes to each other, and eventually dynamically rearranging the mapping of the computation tasks during runtime, based on the information provided by daemons about the efficiency of the execution o the computation task, and dynamically reassigning the computation nodes and computation boosters to each other.

The invention claimed is:

1. A method of operating a heterogeneous computing system comprising a plurality of computation nodes and a plurality of booster nodes, at least one of the plurality of computation nodes and a plurality of booster nodes being arranged to compute a computation task, the computation task comprising a plurality of sub-tasks, the method comprising:

in a first computing iteration, assigning and processing the plurality of sub-tasks by at least a portion of the plurality of computation nodes and at least a portion of the plurality of booster nodes in a first distribution; and generating, using information relating to the processing of the plurality of sub-tasks by at least the portion of the plurality of computation nodes and at least the portion of the plurality of booster nodes, a further distribution of the plurality of sub-tasks between the plurality of computation nodes and the plurality of booster nodes for processing thereby in a further computing iteration.

2. The method according to claim 1, wherein an application manager receives the information and determines the further distribution.

3. The method according to claim 2, wherein a resource manager determines the assignment of the plurality of sub-tasks to the plurality of computation nodes and the plurality of booster nodes for the first computing iteration as a function of the computation task and wherein the application manager receives the information and processes the information as input to the resource manager such that the resource manager dynamically alters further distribution during the computing of the computation task.

4. The method according to claim 3, wherein the resource manager receives the information such that the resource manager dynamically alters assignment of the plurality of computation nodes and the plurality of booster nodes to each other during the computation of the computation task.

5. The method according to claim 1, wherein daemons operate in the plurality of computation nodes and the plurality of booster nodes to generate the information.

6. The method according to claim 1, wherein the first distribution is determined based on a rating provided in source code for each sub-task in the plurality of sub-tasks.

7. The method according to claim 1, wherein the information is used to provide a grouping of sub-tasks in at least one of the first computing iteration and the further computing iteration.

8. The method according to claim 3, wherein a daemon operating at a node generates a measure of a loading of the node during processing of a sub-task of the plurality of sub-tasks.

9. A heterogeneous computing system comprising:

a plurality of computation nodes and a plurality of booster nodes for computing one or more tasks comprising multiple sub-tasks;

a communication interface connecting the plurality of computation nodes with each other and the plurality of booster nodes;

a resource manager for assigning at least a portion of the plurality of booster nodes and at least a portion of the plurality of computation nodes to each other for the computing of the one or more tasks in a first computing iteration; and an application manager configured to receive information from daemons operating in at least the portion of the plurality of computation nodes and at least the portion of the plurality of booster nodes to update a distribution of the multiple sub-tasks between the plurality of computation nodes and the plurality of booster nodes in a further computing iteration.

10. The heterogeneous computing system according to claim 9, wherein the resource manager receives the information such that the resource manager dynamically alters assignment of the plurality of computation nodes and the plurality of booster nodes to each other.

* * * * *